United States Patent
Liou et al.

(10) Patent No.: US 7,936,351 B2
(45) Date of Patent: May 3, 2011

(54) APPARATUS, METHOD, AND COMPUTER READABLE MEDIUM THEREOF CAPABLE OF PRE-STORING DATA FOR GENERATING SELF-SHADOW OF A 3D OBJECT

(75) Inventors: Yu-Shuo Liou, Tainan (TW); Jung Hong Chuang, Hsinchu (TW); Yu-Jung Cheng, Yilan County (TW)

(73) Assignee: Institute for Information Industry, Taipei (TW)

( * ) Notice: Subject to any disclaimer, the term of this patent is extended or adjusted under 35 U.S.C. 154(b) by 832 days.

(21) Appl. No.: 11/682,140

(22) Filed: Mar. 5, 2007

(65) Prior Publication Data

US 2008/0143721 A1 Jun. 19, 2008

(30) Foreign Application Priority Data

Dec. 14, 2006 (TW) .............................. 95146907 A

(51) Int. Cl.
*G06T 15/00* (2011.01)
(52) U.S. Cl. .................... 345/419; 345/420; 345/582
(58) Field of Classification Search ............. None
See application file for complete search history.

(56) References Cited

U.S. PATENT DOCUMENTS

| | | | | |
|---|---|---|---|---|
| 5,222,205 A | * | 6/1993 | Larson et al. | 345/587 |
| 5,870,509 A | * | 2/1999 | Alcorn | 382/293 |
| 6,201,546 B1 | * | 3/2001 | Bodor et al. | 345/620 |
| 6,559,845 B1 | * | 5/2003 | Harvill et al. | 345/473 |
| 7,038,683 B1 | * | 5/2006 | Seefeldt et al. | 345/473 |
| 7,095,419 B2 | * | 8/2006 | Baker et al. | 345/582 |
| 7,145,562 B2 | * | 12/2006 | Schechter et al. | 345/420 |
| 7,692,657 B2 | * | 4/2010 | Gauthier | 345/473 |
| 2003/0038798 A1 | * | 2/2003 | Besl et al. | 345/420 |
| 2004/0243387 A1 | * | 12/2004 | De Brabander | 704/1 |

* cited by examiner

*Primary Examiner* — Said Broome
(74) *Attorney, Agent, or Firm* — Patterson Thuente Christensen Pedersen, P.A.

(57) ABSTRACT

A sphere tree is first generated. Accessibility values and occlusion angles corresponding to each vertex of a 3D object are calculated according to the sphere tree. A 2D texture and a 3D texture are then generated to store the accessibility values and occlusion angles. When a self-shadow effect of the 3D object is required to be generated, the relation of the spheres in the sphere tree is updated, and a 3D image is formed by retrieving the values in the 2D texture and the 3D texture according to the updated sphere tree. Since the 2D texture and the 3D texture are pre-stored, the real time calculation load is hugely reduced while the self-shadow effect is processed.

4 Claims, 7 Drawing Sheets

APPARATUS, METHOD, AND COMPUTER READABLE MEDIUM THEREOF CAPABLE OF PRE-STORING DATA FOR GENERATING SELF-SHADOW OF A 3D OBJECT

This application claims priority to Taiwan Patent Application No. 095146907 filed on Dec. 14, 2006. The disclosures of which are incorporated herein by reference in its entirety.

CROSS-REFERENCES TO RELATED APPLICATIONS

Not applicable.

BACKGROUND OF THE INVENTION

1. Field of the Invention

The present invention relates to a method, an apparatus, and a computer readable medium thereof for pre-calculating and pre-storing information required to generate a self-shadow image and, during generation of the self-shadow image, retrieving the information to save time of real-time calculation.

2. Descriptions of the Related Art

With the progress of the multimedia and image processing technology, the animation industry has advanced from producing traditional flat image to producing 3D movies. Therefore, the current animated movies become more realistic. One of the key points to be realistic is the generation of shadow.

To generate self-shadow of an object in animated movies, there are many ways in the prior art, such as global illumination algorithm. However, it fails to provide real-time calculation.

Another way, ambient occlusion, performs ray tracing on an object's surface once to obtain the information of self-occlusion. More specifically, the technology of ambient occlusion calculates average visibility in environment vertex by vertex. With reference to the average visibility, a soft self-shadow effect on the object's surface may be created. Although the idea of ambient occlusion is simple, it needs considerable calculation amount because visibility calculation requires to be performed on all vertexes of the object's surface in every direction. Real-time calculation is still impossible.

Since every part of a dynamic object is moving in terms of time, the self-shadow changes all the time. The above-mentioned technologies for generating self-shadow have the drawback of failure in real-time processing so they are not suitable for generating self-shadow of a dynamic object. Accordingly, how to generate self-shadow of a dynamic object in animated movies is still a problem in the industry.

SUMMARY OF THE INVENTION

The present invention provides a solution to generating self-shadow of a dynamic object. The solution uses a plurality of spheres to approximate the outward appearance of the dynamic object in order to simplify the calculation of accessibility and occlusion angles. Furthermore, the solution pre-stores the information required during the calculation of accessibility and occlusion angles and the information of preventing incorrect calculation of self-shadow caused by two overlapped spheres into textures so that the real-time calculation can be sped up.

The present invention is capable of dynamically adjusting the relative positions of the spheres with reference to the skin-bone structure of the dynamic object so that the sphere tree may respond to the movement of the dynamic object in time.

The aforementioned information required during the calculation of accessibility may be the calculation of the area on the top half surface of a sphere covering a vertex of the dynamic object occluded in different angles and different positions in space. The information and the occlusion angles are stored in a 2D texture.

To prevent the incorrect calculation of self-shadow, a big sphere for approximating two spheres can be used. The total occluded area values and included angles of the big sphere are stored in a 3D texture.

The 2D texture and the 3D texture are pre-stored. When self-shadow of a dynamic object requires to be generated, the positions of the spheres in the sphere tree are first updated, and the occlusion effect of each vertex of the dynamic object is calculated by retrieving the data in the textures. The self-shadow will be mapped to the 3D image of the dynamic object.

The amount of the real-time calculation amount for forming a 3D image of a dynamic object in accordance with the present invention is hugely decreased since the 2D and 3D textures are pre-stored. The problem of the prior art is solved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
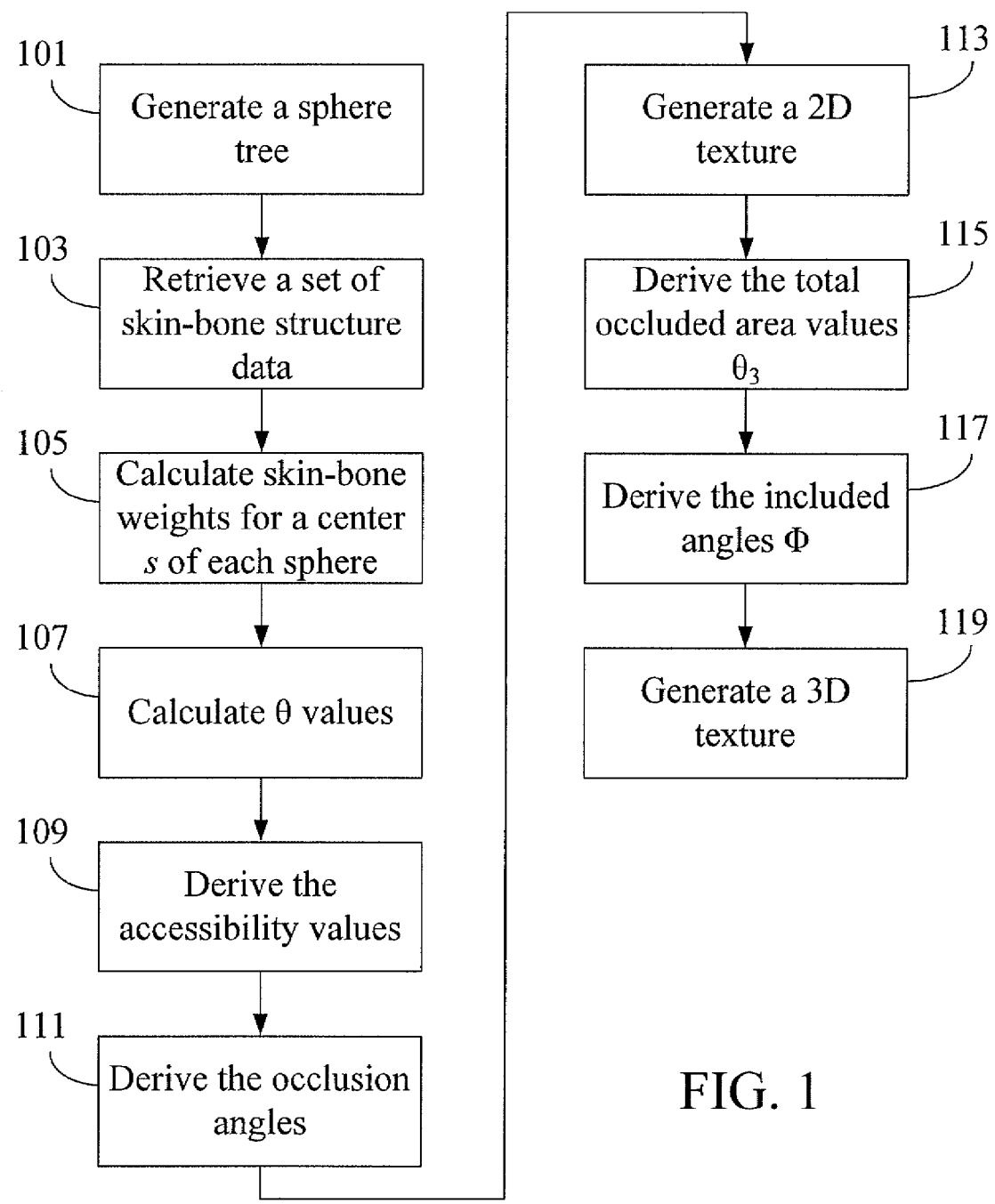
FIG. 1 illustrates a flow chart when a first embodiment of the present invention operates in a first stage.

A first embodiment of the present invention is a method for forming a 3D image of a dynamic object; in particular, for generating self-shadow of the dynamic object. The method may be separated into two stages: one stage is executed before the 3D image is going to be formed, and the other is executed while the 3D image is formed. The steps in the first stage are illustrated in FIG. 1.

In step 101, a sphere tree for the dynamic object is generated. The sphere tree comprises a plurality of spheres which are arranged hierarchically to approximate relative positions of parts of the dynamic object. There are many algorithms for generating a sphere tree in the art. Taking the Octree algorithm as an example, a cube is initially built, wherein the cube completely covers the dynamic object. Then the cube is divided into eight sub-cubes along the x, y, and z axes. The division on each sub-cube is continued until a small cube approaches a node which represents one part of the dynamic object. Each node is covered by a generated sphere. The position of each sphere in the sphere tree is determined according to which cube it belongs to. Since the Octree algorithm divides the dynamic object into eight sub-cubes initially, the highest layer of the sphere tree has eight big spheres.

In addition to the Octree algorithm, there are some other algorithms available for generating a sphere tree, such as the Hubbard algorithm, the Grid algorithm, the Merge algorithm, the Burst algorithm, the Expand algorithm, the Spawn algorithm, and the Combined algorithm. The present invention does not limit that which algorithm is necessary to generate a sphere tree.

Generally speaking, the outward appearance of the dynamic object is defined by a set of skin-bone structure data. The first embodiment further uses the set of skin-bone structure data to adjust the relative positions of the spheres in the sphere tree so that the relative positions may correspond to the parts of the dynamic object more precisely.

Therefore, the set of skin-bone structure data is retrieved from a memory in step 103.

Then step 105 is executed in which skin-bone weights for a center s of each sphere are calculated according to the set of skin-bone structure data. Assume that there are N vertexes covered by a sphere, the bone parameters associated with the vertexes are $b_1$-$b_m$, the weight of the vertexes corresponding to $b_i$ is $w_{ij}$, wherein i denotes the $i^{th}$ bone parameter and j denotes the $j^{th}$ vertex. For example, the weight of the third vertex corresponding to $b_4$ is $w_{43}$, and the weight of the sixth vertex corresponding to $b_8$ is $w_{86}$. The skin-bone weights for the center s may be derived by:

$$w_{si} = \frac{\sum_{j=1}^{N} w_{ij}}{w_{total}} \tag{1}$$

wherein $w_{si}$ denotes the skin-bone weight for the center s corresponding to $b_i$, and $$w_{total} = \sum_{j=1}^{N}\sum_{i=1}^{M} w_{ij} \tag{2}$$

In addition to the above equations, the skin-bone weights may be represented in the barycentric coordinate. The equation for deriving the skin-bone weights is:

$$w_{si} = \frac{\sum_{j=1}^{N} \beta_j \cdot w_{ij}}{w_{total}} \tag{3}$$

$$w_{total} = \sum_{j=1}^{N}\sum_{i=1}^{M} \beta_j \cdot w_{ij} \tag{4}$$

wherein $\beta_j$ is the barycentric coordinate of the center s with respect to the $j^{th}$ vertex.

Figure 2:
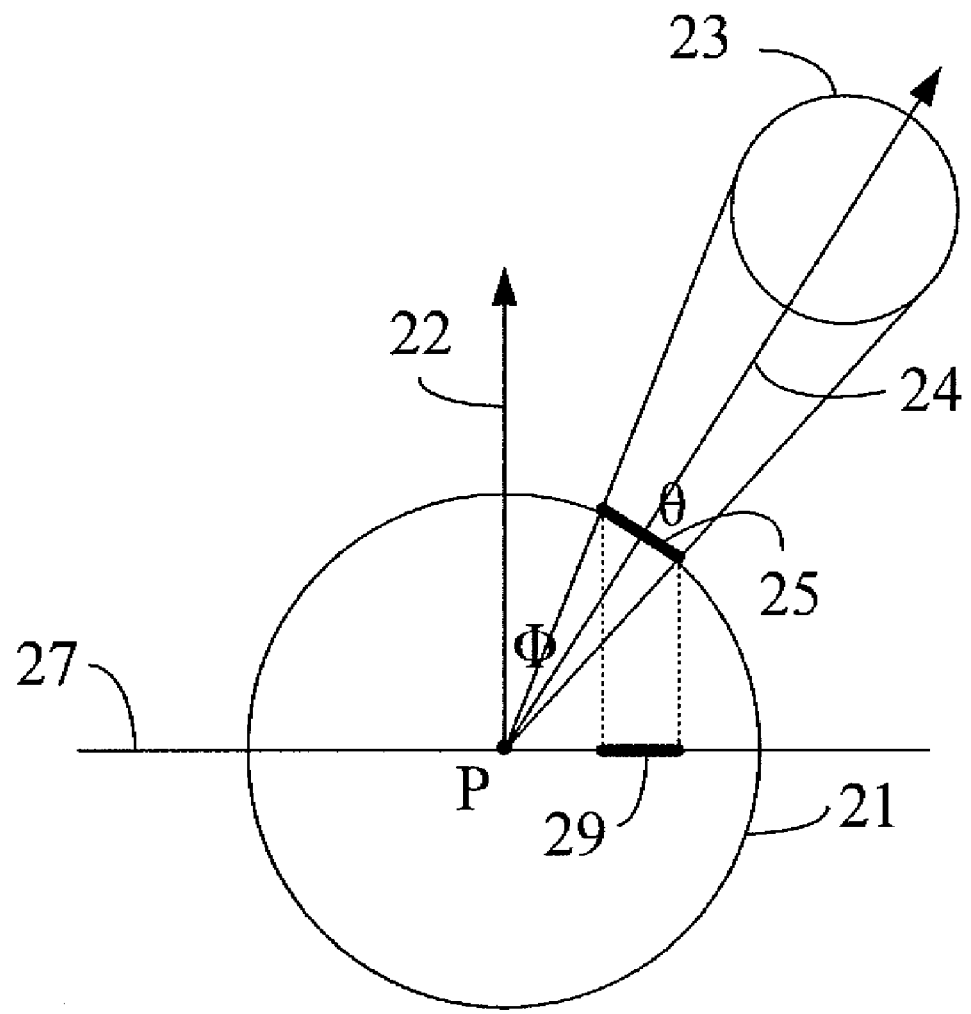
FIG. 2 illustrates what the accessibility values and occlusion angle values are.

Then, for all vertexes of the dynamic object, accessibility values and occlusion angle values of each of the spheres are calculated. FIG. 2 is used to recite what the accessibility values and occlusion angle values are. As FIG. 2 shows, a vertex p of the dynamic object is covered by a sphere 21. When the shadow on the vertex p resulting from the occlusion of a part of the dynamic object, which is covered by a sphere 23, is considered, the sphere 23 makes the surface of the sphere 21 generate a projected area 25 of which the measure is θ. The measure of the area on the horizontal plane 27 of the sphere 21 mapped by the projected area 25, i.e., area 29 is one of the accessibility values. It is noted that the spheres 21 and 23 are two of the spheres in the sphere tree. The occlusion angle is the included angle between a mean occlusion direction and the normal vector 22. If the sphere 23 locates completely above the horizontal plane 27, the occlusion angle equals to Φ.

It is noted that the size of the sphere 23 and the distance between the sphere 23 and vertex p are not material in the stage because any sphere fixes into the two tangent lines (actually a cone in space) can cause the same occlusion effect on the vertex p. In other words, the accessibility values and the occlusion angle values are identical as long as the area θ and the angle Φ are the same. Therefore, the following steps are executed to derive the accessibility values and the occlusion angles in different areas θ and the angles Φ.

In step 107, θ values of the sphere 21 caused by all of the spheres are calculated according to different angles Φ. As FIG. 2 shows, the angle Φ is the included angle between a normal vector 22 of the sphere 21 and a vector 24 from the vertex p to the center of the sphere 23. The θ calculation simply involves geometry algebra.

Then step 109 is executed in which the accessibility values are derived based on different θs and Φs. In particular, the accessibility values may be derived by using the Monte Carlo approach on the following equation:

$$A = \int_0^{2\pi} \int_0^{\frac{\pi}{2}} V(\alpha, \beta)\cos\alpha\sin\alpha\, d\alpha\, d\beta \tag{5}$$

wherein A denotes one of the accessibility values, $V(\alpha,\beta)$ denotes a visibility function which determines the visibility of the top half of the sphere 21 in the spherical coordinate α and β. The θ and Φ are two dimensions of a texture which will be described below, wherein the Φ is the included angle between the normal vector 22 and the vector 24, and the θ is the cambered surface or area on the top half of the sphere 21 projected by the sphere 23. The θ influences the integration result of $V(\alpha,\beta)$. The larger the θ is, the larger the corresponding accessibility value is and, hence, the larger the integration result of $V(\alpha,\beta)$ is. The Φ influences the integration result of $\cos(\alpha)$. If the Φ is larger, that means the sphere 23 is closer to horizontal plane 27 so the project area on the sphere 21 gets smaller. The integration result of $\cos(\alpha)$ is, hence, smaller. In the first embodiment, the ranges of the θ and Φ are respectively (0, 2π) and (0, π) since the range of the texture coordinate is (0, 1), the texture coordinate (θ, Φ) represents (θ*2π, Φ*π). If the direction in the coordinate (α,β) is occluded by the sphere 23, $V(\alpha,\beta)=1$. Otherwise, $V(\alpha,\beta)=0$.

Alternatively, the accessibility values may be derived by using the probability density function:

$$A = \frac{1}{S}\sum_{i=1}^{S} \frac{V(\alpha_i, \beta_i)\cos\alpha_i\sin\alpha_i}{p(\alpha_i, \beta_i)} \tag{6}$$

wherein S denotes the number of the samples under the Monte Carlo approach, $(\alpha_i,\beta_i)$ represents the $i^{th}$ direction sample, and $p(\alpha_i,\beta_i)$ denotes the probability density function.

The step 111 is executed in which the occlusion angles are derived based on different θs and Φs. Similarly, the occlusion angles may be derived by using the Monte Carlo approach on the following equation:

$$OA = \int_0^{2\pi} \int_0^{\frac{\pi}{2}} V(\alpha, \beta) \alpha \sin\alpha \, d\alpha \, d\beta \qquad (7)$$

wherein the OA denotes one of the occlusion angles, and the relations between θ, Φ and equation (7) are as above-mentioned. Alternatively, the occlusion angles may be derived by using the probability density function:

$$OA = \frac{1}{N} \sum_{i=1}^{N} \frac{V(\alpha_i, \beta_i) \alpha_i}{p(\alpha_i, \beta_i)} \qquad (8)$$

Figure 3:
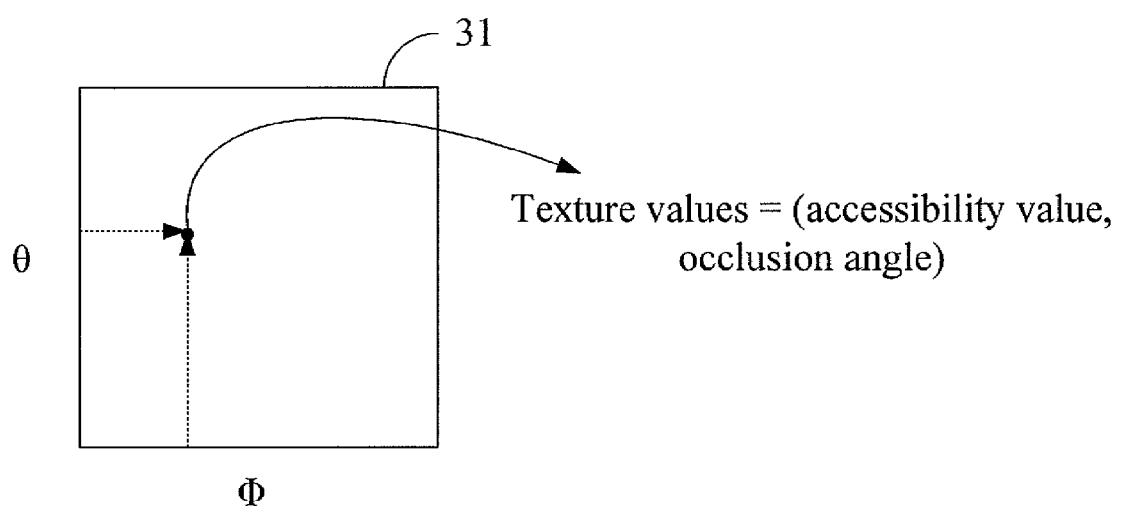
FIG. 3 illustrates a 2D texture.

Then step 113 is executed in which a 2D texture is generated based on different θs and Φs. More particularly, the accessibility values and the occlusion angles corresponding to different θs and Φs are derived in steps 109 and 111. In step 113, theses values and angles are stored into a 2D texture. As mentioned above, no matter how big the volume of a sphere is, θ is impossible to exceed 2π and Φ is impossible to exceed π. Therefore, the 2D texture simply stores the values and angles within (0, 2π) and (0, π), respectively. As FIG. 3 shows, the 2D texture 31 is defined by θ and Φ. Each particular coordinate (θ, Φ) corresponds to two values, i.e., an accessibility value and an occlusion angle. Accordingly, the 2D texture 31 records the occlusion influence on the vertex p caused by a single sphere.

Figure 4A:
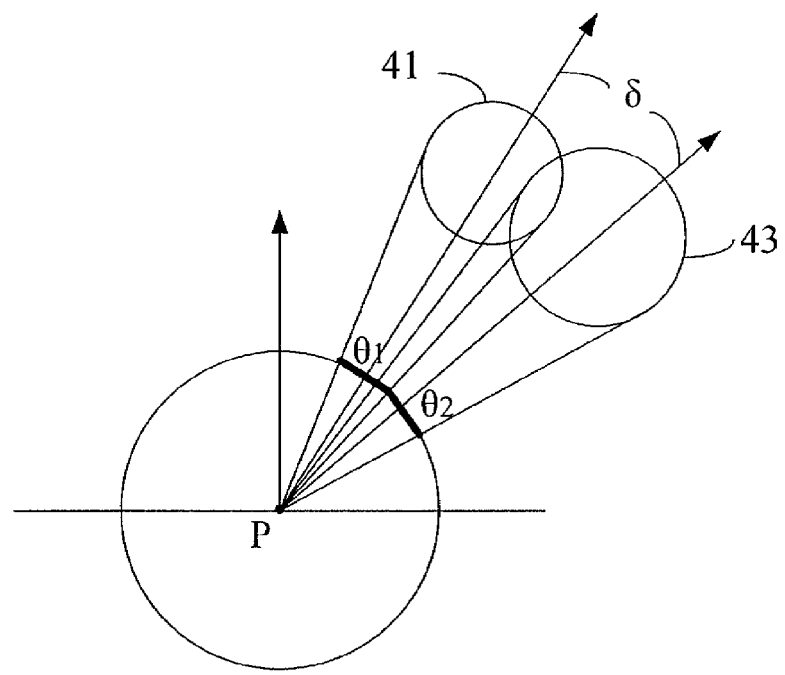
FIG. 4A illustrates the occlusion influence on a vertex caused by two spheres.
Figure 4B:
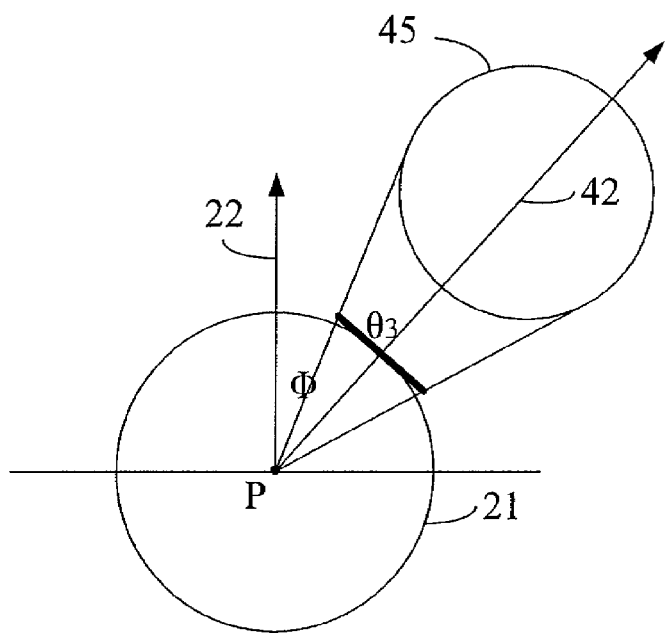
FIG. 4B illustrates how to use a big sphere to replace the two spheres.

In addition to considering the occlusion influence caused by a single sphere, the present invention is capable of solving the problem of the occlusion influence caused by several spheres which overlap. As FIG. 4A shows, assume that there are two spheres 41 and 43 occluding the vertex p, wherein the θ values are $\theta_1$ and $\theta_2$ respectively, and the included angle between the spheres 41 and 43 is denoted as δ. To consider the occlusion influence on the vertex p caused by the spheres 41 and 43, a big sphere 45 is introduced as FIG. 4B shows. The projected area of the big sphere 45 is $\theta_3(=\theta_1+\theta_2)$ and the included angle between the normal vector 22 and a vector 42 from the vertex p to the center of the big sphere 45 is Φ. Therefore, considering the occlusion influence caused by the big sphere 45 refers to considering the occlusion influence caused by the spheres 41 and 43. The complexity of calculating the occlusion influence caused by several overlapping spheres is decreased. Similarly, the size of the big sphere 45 and the distance between the big sphere 45 and vertex p are not material in the stage because any two overlapping spheres fix into the two tangent lines (actually a cone in space) can cause the same occlusion effect on the vertex p. In other words, the total occluded area $\theta_3$ and the angle Φ are identical as long as $\theta_1$, $\theta_2$ and δ are the same. Therefore, the following steps are executed to derive the total occluded area $\theta_3$ and the included angle Φ in different $\theta_1$s, $\theta_2$s and δs.

To achieve that, step 115 is executed in which the total occluded area values $\theta_3$ are derived based on different $\theta_1$s, $\theta_2$s and δs. The total occluded area values $\theta_3$ may be derived by using the Monte Carlo approach on the following equation:

$$TOA = \int_0^{2\pi} \int_0^{\pi} V(\alpha, \beta) \sin\alpha \, d\alpha \, d\beta \qquad (9)$$

wherein TOA denotes one of the total occluded area values $\theta_3$. The larger the $\theta_1$ and $\theta_2$ are, the larger the total projected area is and, hence, the larger the integration result is. The smaller the δ is, the larger the overlap of the spheres 41 and 43 is and, hence, the smaller the integration result might be. If the spheres 41 and 43 do not overlap, the value of δ would not influence the integration result. Alternatively, the total occluded area values $\theta_3$ may be derived by using the probability density function:

$$TOA = \frac{1}{N} \sum_{i=1}^{N} \frac{V(\alpha_i, \beta_i) \sin\alpha_i}{p(\alpha_i, \beta_i)} \qquad (10)$$

Then, step 117 is executed in which the included angles Φ are derived based on different $\theta_1$s, $\theta_2$s and δs. The included angles Φ may be derived by using the Monte Carlo approach on the following equation:

$$\Phi = \int_0^{2\pi} \int_0^{\pi} V(\alpha, \beta) \, \text{angle}(\alpha, \beta) \sin\alpha \, d\alpha \, d\beta \qquad (11)$$

wherein angle (α,β) is the included angle between the (α,β) direction and the sphere 41, and the relations between $\theta_1$, $\theta_2$, δ and equation (11) are as above-mentioned. Alternatively, the included angles Φ may be derived by using the probability density function:

$$\Phi = \frac{1}{N} \sum_{i=1}^{N} \frac{V(\alpha_i, \beta_i) \, \text{angle}(\alpha_i, \beta_i) \sin\alpha_i}{p(\alpha_i, \beta_i)} \qquad (12)$$

It is noted that only the probability density function which matches the following relationship is suitable while it is used to derive the values and angles of the invention:

$$\int_0^{2\pi} \int_0^{\frac{\pi}{2}} p(\alpha, \beta) \sin\alpha \, d\alpha \, d\beta = 1 \qquad (13)$$

Figure 5:
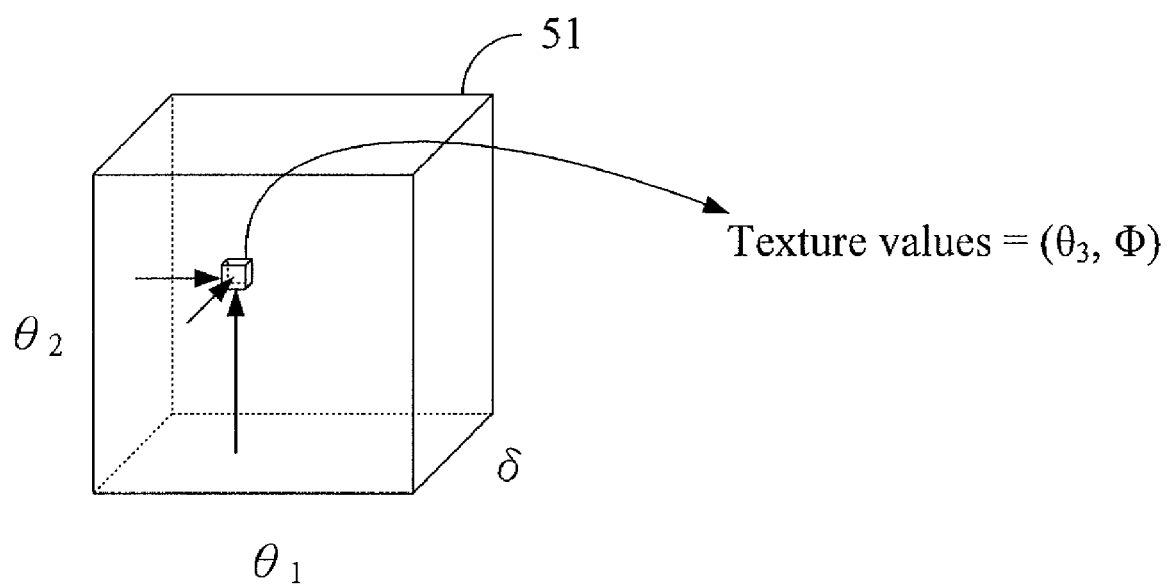
FIG. 5 illustrates a 3D texture.

Then step 119 is executed in which a 3D texture is generated based on different $\theta_1$s, $\theta_2$s and δs. More particularly, the total occluded areas $\theta_3$ and the included angles Φ corresponding to different $\theta_1$s, $\theta_2$s and δs are derived in steps 115 and 117. In step 119, theses values and angles are stored into a 3D texture. As FIG. 5 shows, the 3D texture 51 is defined by $\theta_1$, $\theta_2$ and δ. Each particular coordinate ($\theta_1$, $\theta_2$, δ) corresponds to two values, i.e., $\theta_3$ and Φ. Accordingly, the 3D texture 51 records the occlusion influence on the vertex p caused by multiple spheres.

Figure 6:
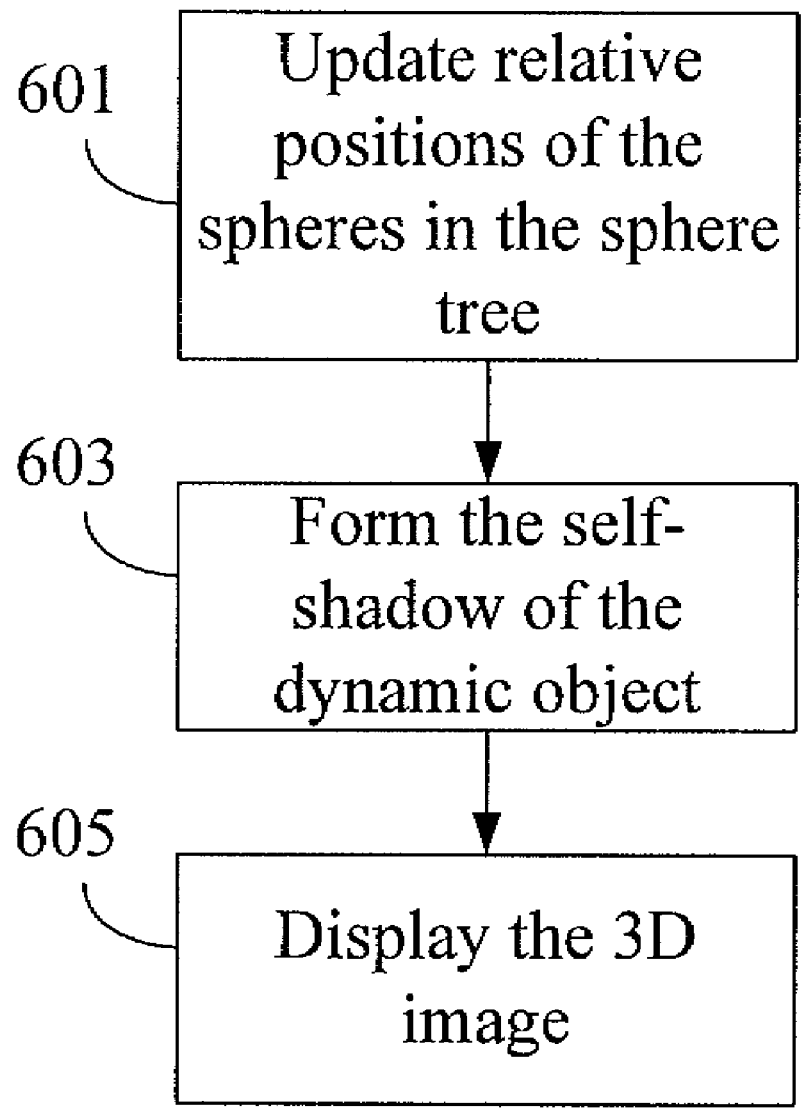
FIG. 6 illustrates a flow chart when the first embodiment operates in a second stage.

The first stage is now done. The following steps are executed, while the 3D image of the dynamic object requires to be displayed, to generate the self-shadow of the dynamic object in real time based on the 2D texture 31, the 3D texture 51, and the sphere tree. The steps in the second stage are shown in FIG. 6.

In step 601, relative positions of the spheres in the sphere tree are updated according to a current movement of the dynamic object. In detail, a pixel shader is used to calculate the current positions of the vertexes and the spheres with reference to the skin-bone weights derived in step 105. The calculation results are stored in a sphere hierarchy texture.

Then step 603 is executed in which appropriate values and angles are retrieved from the 2D texture and the 3D texture to form the self-shadow of the dynamic object according to the relative positions. Since spheres in a higher layer of the sphere tree have larger volume, the whole dynamic object can be covered by fewer spheres if spheres in a higher layer are used. On the contrary, spheres in a lower layer of the sphere tree have smaller volume; however, the details of the dynamic object can be reserved. During the calculation of the self-shadow, a certain number of spheres in the sphere tree must be selected for every vertex required to obtain its self-shadow effect. One way to select spheres is: determining four spheres closest to the vertex in every layer; generating a macro view of the self-shadow according to the four spheres in the highest layer; and generating a micro view of the self-shadow according to the spheres in the lower layer. Because all of the shadow effects caused by the spheres can be found its corresponding values in the 2D texture and the 3D texture, an interpolation operation is performed according to $\theta$ and/or $\delta$ to derive the accessibility values and occlusion angles in this step.

In particular, a rectangle whose size corresponding to a screen size is first generated. The accessibility values for each vertex are used to generate the optical effect of the corresponding pixel. The pixel shader calculates the projected area and handles the issue of overlapping spheres according to the sphere hierarchy texture, 2D texture, and the 3D texture, and finally stores the calculation results in an environment occlusion texture.

Then step 605 is executed in which the 3D image is displayed according to the environment occlusion texture, wherein the 3D image comprises the self-shadow.

Figure 7:
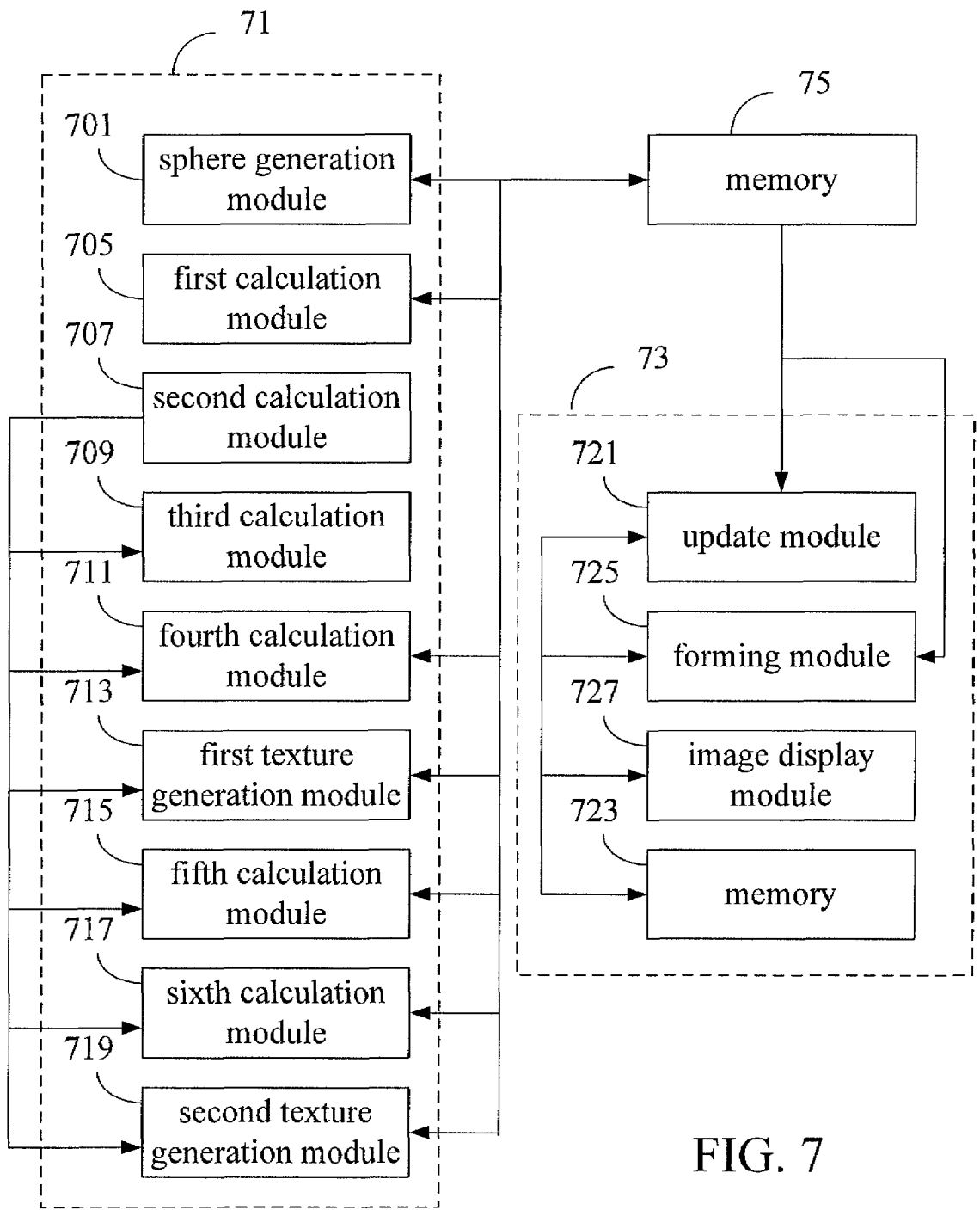
FIG. 7 illustrates a second embodiment of the present invention.

A second embodiment of the present invention is an apparatus for forming a 3D image of a dynamic object. The apparatus is capable of performing the steps shown in FIG. 1 and FIG. 6 to generate self-shadow of the dynamic object. As FIG. 7 shows, the apparatus comprises a pre-processing module 71, a real-time processing module 73, and a memory 75. The pre-processing module 71, comprising a sphere generation module 701, a first calculation module 705, a second calculation module 707, a third calculation module 709, a fourth calculation module 711, a first texture generation module 713, a fifth calculation module 715, a sixth calculation module 717, and a second texture generation module 719, is configured to operate before the 3D image is going to be formed. That is, the pre-processing module 71 is configured to execute the steps in FIG. 1. The real-time processing module 73, comprising an update module 721, a memory 723, a forming module 725, and an image display module 727, is configured to operate while the 3D image is formed. That is, the real-time processing module 73 is configured to execute the steps in FIG. 6.

First, the sphere generation module 701 generates a sphere tree for the dynamic object (step 101). The sphere tree comprises a plurality of spheres which are arranged hierarchically to approximate relative positions of parts of the dynamic object. The sphere generation module 701 utilizes one of the current algorithms to generate a sphere tree in the art, such as the Octree algorithm, the Hubbard algorithm, the Grid algorithm, the Merge algorithm, the Burst algorithm, the Expand algorithm, the Spawn algorithm, and the Combined algorithm. The sphere tree is stored in the memory 75.

Then the first calculation module 705 retrieves a set of skin-bone structure data and the sphere tree from the memory 75 (step 103) to calculate skin-bone weights for a center s of each sphere (step 105). Similarly, assume that there are N vertexes covered by a sphere, the bone parameters associated with the vertexes are $b_1$-$b_m$, the weight of the vertexes corresponding to $b_i$ is $w_{ij}$, wherein i denotes the $i^{th}$ bone parameter and j denotes the $j^{th}$ vertex. The first calculation module 705 may derive the skin-bone weights for the center s according to equations (1) and (2), or (3) and (4). The skin-bone weights are stored in the memory 75.

Then, the second calculation module 707 calculates $\theta$ values of the sphere 21 in FIG. 2 according to different angles $\Phi$ (step 107). As FIG. 2 shows, the angle $\Phi$ is the included angle between the normal vector 22 of the sphere 21 and the vector 24 from the vertex p to the center of the sphere 23. The $\theta$ calculation simply involves geometry algebra.

The third calculation module 709 retrieves $\theta$ values from the second calculation module 707 and calculates the accessibility values according to equation (5) or (6) (step 109). The accessibility values are stored in the memory 75.

The fourth calculation module 711 retrieves $\theta$ values from the second calculation module 707 and calculates the occlusion angles based on different $\Phi$s according to equation (7) or (8) (step 111). The occlusion angles are stored in the memory 75.

Therefore, the third calculation module 709 and the fourth calculation module 711, namely a single sphere calculation module in combination, calculate the accessibility values and the occlusion angles of each sphere.

Then the first texture generation module 713 retrieves $\theta$ values from the second calculation module 707 and retrieves the accessibility values and the occlusion angles from the memory 75 to generate a 2D texture based on different $\Phi$s (step 113). The 2D texture records the occlusion influence on the vertex p caused by a single sphere, wherein the relations between ($\theta$, $\Phi$) and (the accessibility values, the occlusion angles) are shown in FIG. 3. The 2D texture is stored in the memory 75.

In addition to considering the occlusion influence caused by a single sphere, the present invention is capable of solving the problem of the occlusion influence caused by several spheres which overlap. As FIG. 4A shows, assume that there are two spheres 41 and 43 occluding the vertex p, wherein the $\theta$ values are $\theta_1$ and $\theta_2$ respectively, and the included angle between the spheres 41 and 43 is denoted as $\delta$. To consider the occlusion influence on the vertex p caused by the spheres 41 and 43, a big sphere 45 is introduced as FIG. 4B shows. The projected area of the big sphere 45 is $\theta_3(=\theta_1+\theta_2)$ and the included angle between the normal vector 22 and a vector 42 from the vertex p to the center of the big sphere 45 is $\Phi$. Therefore, considering the occlusion influence caused by the big sphere 45 refers to considering the occlusion influence caused by the spheres 41 and 43. The complexity of calculating the occlusion influence caused by several overlapping spheres is decreased. Similarly, the size of the big sphere 45 and the distance between the big sphere 45 and vertex p are not material in the stage because any two overlapping spheres fix into the two tangent lines (actually a cone in space) can cause the same occlusion effect on the vertex p. In other words, the total occluded area $\theta_3$ and the angle $\Phi$ are identical as long as $\theta_1$, $\theta_2$ and $\delta$ are the same. Therefore, the following steps are executed to derive the total occluded area $\theta_3$ and the included angle $\Phi$ in different $\theta_1$s, $\theta_2$s and $\delta$s.

To achieve that, the fifth calculation module 715 retrieves $\theta$ values from the second calculation module 707 and retrieves the occlusion angles from the memory 75 to calculate the total occluded area values $\theta_3$ according to equation (9) or (10) (step 115). The total occluded area values $\theta_3$ are stored in the memory 75.

Then, the sixth calculation module 717 retrieves $\theta$ values from the second calculation module 707 and retrieves the occlusion angles from the memory 75 to calculate the included angles $\Phi$ according to equation (11) or (12) (step 117). The included angles $\Phi$ are stored in the memory 75.

Therefore, the fifth calculation module 715 and the sixth calculation module 717, namely a multi-sphere calculation module in combination, calculate the total occluded area values $\theta_3$ and the included angles $\Phi$ of any two spheres.

Similarly, only the probability density function which matches equation (13) is suitable while the third calculation module 709, the fourth calculation module 711, the fifth calculation module 715, and the sixth calculation module 717 use it to derive the values and angles of the invention.

Then the second texture generation module 719 retrieves $\theta$ values from the second calculation module 707 and retrieves the total occluded area values $\theta_3$ and the included angles $\Phi$ from the memory 75 to generate a 3D texture (step 119).

The pre-processing is now done. The real-time processing module 73 then generates the self-shadow of the dynamic object in real time based on the 2D texture, the 3D texture, and the sphere tree stored in the memory 75. That is, the second stage is executed.

The update module 721 retrieves the sphere tree from the memory 75 and updates the relative positions of the spheres in the sphere tree according to a current movement of the dynamic object (step 601). In detail, the pixel shader is used to calculate the current positions of the vertexes and the spheres with reference to the skin-bone weights derived by the first calculation module 705. The calculation results are stored as a sphere hierarchy texture in the memory 723.

Then the forming module 725 retrieves the sphere hierarchy texture from the memory 723, and retrieves appropriate values and angles from the 2D texture and the 3D texture from the memory 75 based on the sphere hierarchy texture to form the self-shadow of the dynamic object (step 603). Since spheres in a higher layer of the sphere tree have larger volume, the whole dynamic object can be covered by fewer spheres if spheres in a higher layer are used. On the contrary, spheres in a lower layer of the sphere tree have smaller volume; however, the details of the dynamic object can be reserved. During the calculation of the self-shadow, a certain number of spheres in the sphere tree must be selected for every vertex required to obtain its self-shadow effect. One way to select spheres is: determining four spheres closest to the vertex in every layer; generating a macro view of the self-shadow according to the four spheres in the highest layer; and generating a micro view of the self-shadow according to the spheres in the lower layer. Because all of the shadow effects caused by the spheres can be found its corresponding values in the 2D texture and the 3D texture, the forming module 725 simply performs an interpolation operation according to $\theta$ and/or $\delta$ to derive the accessibility values and occlusion angles.

In particular, a rectangle whose size corresponding to a screen size is first generated. The accessibility values for each vertex are used to generate the optical effect of the corresponding pixel. The forming module 725 uses the pixel shader to calculate the projected area and handles the issue of overlapping spheres according to the sphere hierarchy texture, 2D texture, and the 3D texture. The calculation results are saved as an environment occlusion texture in the memory 723.

Then the image display module 727 retrieves the environment occlusion texture from the memory 723 to generate the shadow effect of the dynamic object so that the 3D image comprising the self-shadow is displayed (step 604).

The above-mentioned method may be implemented via an application program which stored in a computer readable medium. The computer readable medium can be a floppy disk, a hard disk, an optical disc, a flash disk, a tape, a database accessible from a network or any storage medium with the same functionality that can be easily thought by people skilled in the art.

The amount of the real-time calculation amount for forming the 3D image of the dynamic object in accordance with the present invention is hugely decreased since the 2D and 3D textures are pre-stored. The problem of the prior art is solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A non-transitory computer readable medium for storing a computer program to execute a method for forming a 3D image of a dynamic object, the method comprising the steps of:
   generating a sphere tree for the dynamic object, the sphere tree comprising a plurality of spheres;
   for all vertexes of the dynamic object, calculating accessibility values and occlusion angles of each of the spheres;
   generating a 2D texture according to the accessibility values and occlusion angles;
   for the all vertexes of the dynamic object, calculating total occluded area values and included angles of any two of the spheres;
   generating a 3D texture according to the total occluded area values and included angles;
   updating relative positions of the spheres in the sphere tree according to a movement of the dynamic object;
   retrieving appropriate values and angles from the 2D texture and the 3D texture to form a self-shadow of the dynamic object according to the relative positions; and
   displaying the 3D image, the 3D image comprising the self-shadow.

2. The non-transitory computer readable medium as claimed in claim 1, wherein the method further comprises the steps of: retrieving skin-bone structure data of the dynamic object; and calculating skin-bone weights for a center of each of the spheres according to the skin-bone structure data; wherein the updating step is executed further according to the skin-bone weights.

3. The non-transitory computer readable medium as claimed in claim 1, wherein the step of calculating total occluded area values and included angles comprises a step of setting a big sphere, the big sphere is one of the spheres, and the accessibility values of the big sphere corresponding to a vertex of the dynamic object is equal to a summation of the accessibility values of the two spheres corresponding to the vertex.

4. The non-transitory computer readable medium as claimed in claim 3, wherein the vertex is covered in one of the spheres, and one of the included angles is the angle between a normal vector of the sphere covering the vertex and a vector from the vertex to the center of the big sphere.

* * * * *